Patented Feb. 14, 1933

1,897,795

UNITED STATES PATENT OFFICE

ZOLTAN FÖLDI, OF BUDAPEST, HUNGARY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF C-ALKYL AND C-ARALKYL DERIVATIVES OF AROMATIC COMPOUNDS

No Drawing. Application filed September 12, 1929, Serial No. 392,251, and in Hungary September 19, 1928.

The present invention relates to a process according to which alkyl groups, which may be substituted by aryl radicles, can be linked to a carbon atom (C-alkylation) of the nucleus or of the alkyl side chains of from neutral to acid aromatic compounds by treating the said aromatic compounds with an aromatic sulphonic ester while warming. Generally speaking all aromatic sulphonic acid esters are suitable for such reactions, there are, however, important differences in the reactive power of sulphonic esters of different alcohols. Thus for example the sulphonic esters of the lower aliphatic alcohols only exert C-alkylating action at high temperatures, between 200° and 300° centigrade, at which temperatures, however, a complicated reaction takes place. Not only mono-, but also poly-alkyl derivatives are formed and a part of the material is resinified. The sulphonic acid esters of unsaturated aliphatic alcohols, as for example benzene sulphonic allyl ester, on the contrary react with aromatic compounds at much lower temperatures, between 100° and 150° centigrade. Moreover under still more favourable conditions the sulphonic esters of substituted aliphatic alcohols, as for example benzyl alcohol or phenyl ethyl carbinol, exert a C-alkylating action. The sulphonic esters of the latter alcohols are particularly suitable for the introduction of aralkyl groups into the benzene nucleus or into any other aromatic nucleus.

By the process according to the present invention important intermediate products useful for organic chemical manufacture on a large scale, and also excellent wetting agents by subsequent sulphonation of the products, may be prepared.

The following examples will further illustrate how the said invention may be carried out in practice, but the invention is not restricted to these examples. The parts are by weight.

Example 1

100 parts of toluene sulphonic ethyl ester and 200 parts of benzene are heated in a tube for several hours at 300° centigrade. After cooling the toluene sulphonic acid is washed out with water and the benzene layer is fractionated. After the removal of the unchanged benzene, ethyl benzene, then diethyl benzene and finally a little triethyl benzene distil over. The reaction proceeds according to the equation:

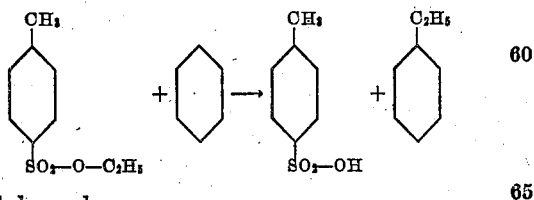

and homologues.

Example 2

100 parts of benzene sulphonic allyl ester and 350 parts of xylene are boiled under a reflux condenser. After boiling for a short period of time benzene sulphonic acid separates out and this is dissolved out with water. The excess of xylene is removed by fractional distillation. 60 parts of an oil remain behind which by fractional distillation in a high vacuum may be separated into unsaturated hydrocarbons and a resin formed by the polymerization of the unsaturated hydrocarbons. The reaction proceeds according to the equation:

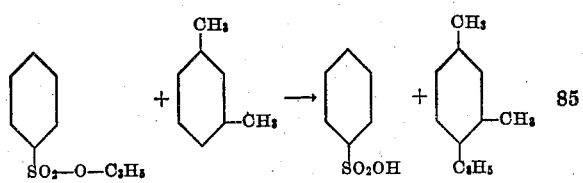

and homologues.

Example 3

50 parts of benzene sulphonic benzyl ester are boiled with 175 parts of benzene. After removal of the benzene sulphonic acid which is formed in a theoretical amount, diphenylmethane and dibenzylbenzene remain behind and may be separated from one another by fractional distillation. The yields are: diphenylmethane 80 per cent and dibenzylbenzene 20 per cent of the theoretical yield.

The reaction proceeds according to the equation:

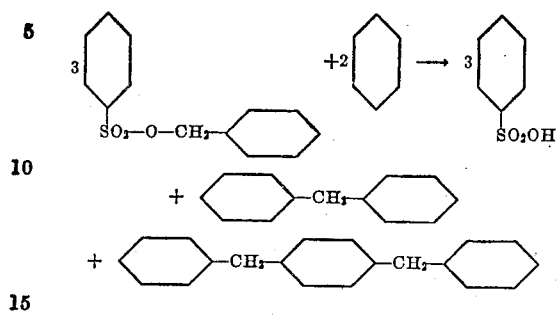

Example 4

Dinitrobenzene is heated with half its weight of toluene sulphonic benzyl ester to 150° centigrade. The sulphonic acid formed is washed out and the unchanged dinitrobenzene is separated from benzyl-dinitrobenzene by distillation in a high vacuum. The latter compound melts at from 183° to 185° centigrade. The reaction proceeds according to the equation:

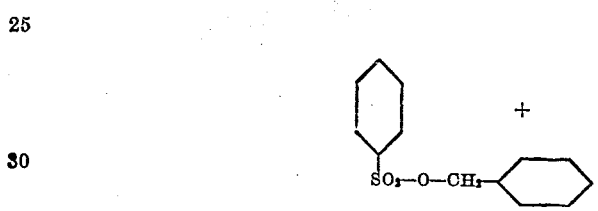

Example 5

50 parts of benzen sulphonic benzyl ester and 150 parts of phenol are heated to 150° centigrade. The sulphonic acid formed and the remainders of phenol are removed in the usual manner. From the remaining mixture of benzylphenols the ortho and para derivatives are separated by the usual methods for example by crystallization or on the basis of

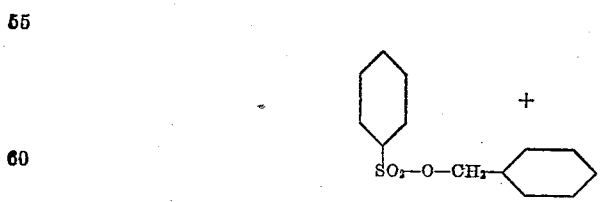

their different acidity. The yields are: parabenzylphenol from 25 to 30 per cent and ortho-benzylphenol from 30 to 40 per cent of the theoretical yield. The reaction proceeds according to the equation:

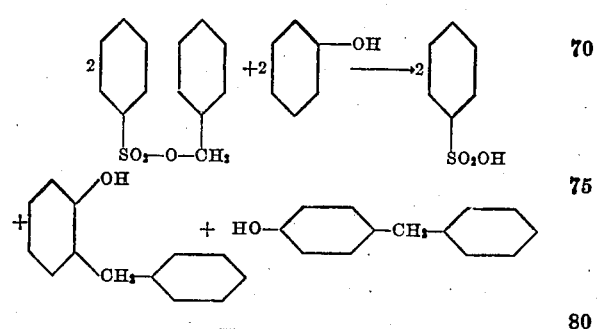

Example 6

25 parts of benzene sulphonic benzyl ester and 100 parts of anisol are boiled for a short time. The further working up is carried out in the manner described in the foregoing examples. The yield of benzyl anicol amounts to 80 per cent of the theoretical amount. The reaction proceeds according to the equation:

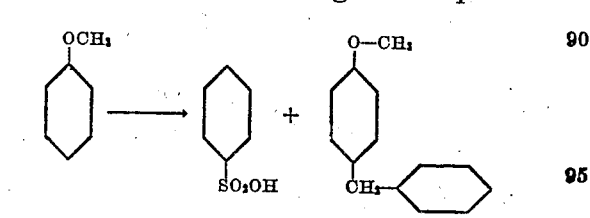

Example 7

25 parts of benzene sulphonic benzyl ester are heated with 42 parts of methyl salicylate. After removing the sulphonic acid formed and the remainders of methyl salicylate the diphneyl methane-hydroxy-carboxylic methyl ester is fractionated. The ester soon solidifies and is crystallized from alcohol. It melts at 80° centigrade and is tasteless and odourless. After saponification it gives the acid which melts at 136° centigrade. The reaction proceeds according to the equation:

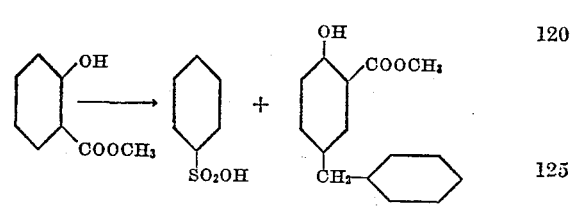

Example 8

25 parts of benzene sulphonic benzyl ester and 50 parts of ethyl cinnamate are heated to 130° centigrade. After removing the sulphonic acid formed, the remainder is fractionally distilled. Several fractions are obtained which contain mono- and di- benzylated cinnamic acid ester. The fraction boiling between 120° and 170° centigrade at a pressure of 1 millimeter of mercury yields, after saponification, α-benzyl cinnamic acid which melts at from 157° to 158° centigrade in a yield of from 12 to 20 per cent of the theoretical amount. The higher boiling fractions contain the dibenzyl cinnamic acid. The reaction proceeds according to the equation:

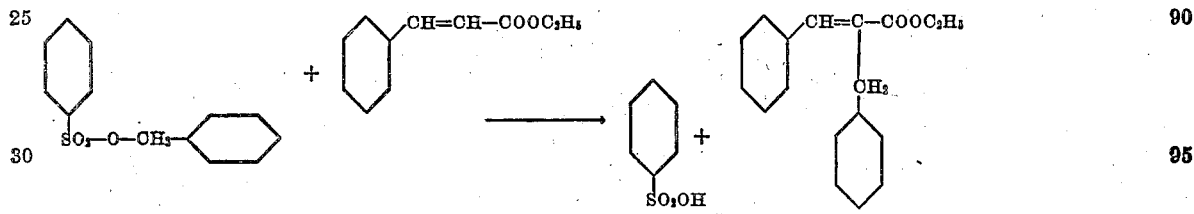

Example 9

Naphthalene sulphonic butyl ester is heated for about several hours to from about 200° to 250° C. The product obtained is soluble in water and possesses, as free acid as well as in the form of alkali metal salts thereof, a very good wetting, cleansing and dispersing power. In this case one part of the sulphonic ester reacts with the other part thereof. The reaction proceeds according to the equation:

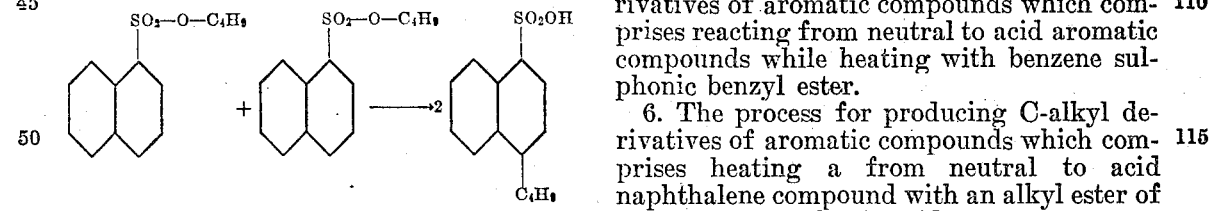

Example 10

100 parts of naphthalene sulphonic acid are heated for some time with 50 parts of benzene sulphonic benzyl ester to about 150° C. When a little water has been added heating to about 80° C. is sufficient. The product obtained is soluble in water and constitutes a highly efficient wetting, cleansing and dispersing agent. A similar product is obtained when naphthalene is treated with the said benzene sulphonic ester in the aforedescribed manner and the product is then treated with a sulphonating agent. The reaction proceeds according to the equation:

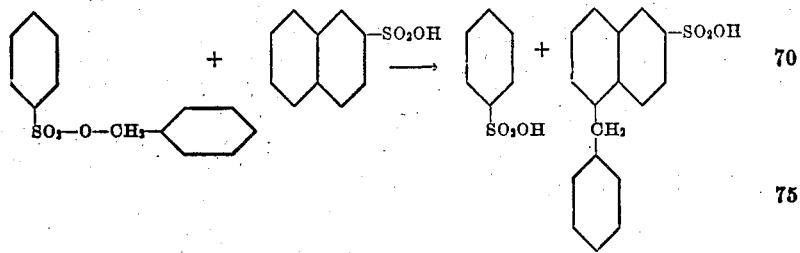

What I claim is:—

1. The process for producing C-alkyl derivatives of aromatic compounds which comprises reacting from neutral to acid aromatic compounds while heating with an alkyl ester of an aromatic sulphonic acid.

2. The process for producing C-alkyl derivatives of aromatic compounds which comprises reacting from neutral to acid aromatic compounds while heating with an alkyl ester of an aromatic monocyclic sulphonic acid.

3. The process for producing C-alkyl derivatives of aromatic compounds which comprises reacting from neutral to acid aromatic compounds while heating with an ester of benzene sulphonic acid with an aliphatic alcohol.

4. The process for producing C-alkyl derivatives of aromatic compounds which comprises reacting from neutral to acid aromatic compounds while heating with an ester of benzene sulphonic acid with an aliphatic alcohol substituted by an aromatic radicle.

5. The process for producing C-alkyl derivatives of aromatic compounds which comprises reacting from neutral to acid aromatic compounds while heating with benzene sulphonic benzyl ester.

6. The process for producing C-alkyl derivatives of aromatic compounds which comprises heating a from neutral to acid naphthalene compound with an alkyl ester of an aromatic sulphonic acid.

7. The process for producing C-alkyl derivatives of aromatic compounds which comprises heating a naphthalene sulphonic ester with an alkyl ester of an aromatic sulphonic acid.

8. The process for producing C-alkyl derivatives of aromatic compounds which comprises heating a from neutral to acid naphthalene compound with a naphthalene sulphonic alkyl ester.

9. The process for producing C-alkyl derivatives of aromatic compounds which comprises heating a polynuclear, from neutral to acid aromatic compound with an alkyl ester of an aromatic sulphonic acid.

10. The process for producing C-alkyl derivatives of aromatic compounds which comprises heating a sulphonic acid of a polynuclear, from neutral to acid aromatic compound with an ester of an aromatic sulphonic acid with an aliphatic alcohol containing more than two carbon atoms.

11. The process for producing C-alkyl derivatives of aromatic compounds which comprises heating naphthalene sulphonic butyl ester to from about 200° to about 250° C.

In testimony whereof I have hereunto set my hand.

ZOLTAN FÖLDI.